United States Patent
Lopez

(10) Patent No.: US 9,695,952 B2
(45) Date of Patent: Jul. 4, 2017

(54) SEQUENTIALLY-GATED MULTI-PORT WATER DISTRIBUTION VALVE

(71) Applicant: Pool Patch LLC, Phoenix, AZ (US)

(72) Inventor: Thomas V. Lopez, Phoenix, AZ (US)

( * ) Notice: Subject to any disclaimer, the term of this patent is extended or adjusted under 35 U.S.C. 154(b) by 81 days.

(21) Appl. No.: 14/620,989

(22) Filed: Feb. 12, 2015

(65) Prior Publication Data

US 2016/0238143 A1    Aug. 18, 2016

(51) Int. Cl.
| G05D 11/00 | (2006.01) |
| F16K 11/072 | (2006.01) |
| F16K 27/04 | (2006.01) |
| F16K 31/16 | (2006.01) |
| F16K 31/524 | (2006.01) |
| E04H 4/12 | (2006.01) |

(52) U.S. Cl.
CPC ............ *F16K 11/072* (2013.01); *F16K 27/04* (2013.01); *F16K 31/16* (2013.01); *F16K 31/52483* (2013.01); *E04H 4/1236* (2013.01); *Y10T 137/269* (2015.04); *Y10T 137/86413* (2015.04)

(58) Field of Classification Search
CPC ......... Y10T 137/269; Y10T 137/86413; Y10T 137/86445; Y10T 137/86517; Y10T 137/86533; Y10T 137/86911

USPC .............................................. 15/1.7; 251/251
See application file for complete search history.

(56) References Cited

U.S. PATENT DOCUMENTS

| 4,313,455 A * | 2/1982 | Pitman .................. F16K 11/074 137/119.07 |
| 4,570,663 A * | 2/1986 | Gould ................... F16K 11/166 137/119.07 |
| 6,189,556 B1 | 2/2001 | Blake et al. |
| 6,325,087 B1 | 12/2001 | Tarr |
| 6,539,967 B2 | 4/2003 | Tarr |
| 8,256,461 B1 * | 9/2012 | Sutton ................... F16K 11/074 123/90.6 |
| 8,714,182 B2 | 5/2014 | Malinasky, Jr. |

* cited by examiner

*Primary Examiner* — R. K. Arundale
(74) *Attorney, Agent, or Firm* — Thomas W. Galvani, P.C.; Thomas W. Galvani

(57) ABSTRACT

A water distribution valve for directing a flow of fluid through a swimming pool cleaning system includes a housing having an inlet and outlets. A plurality of gates are mounted in the housing, each corresponding to a respective one of the outlets. Each gate is mounted to open and close the respective one of the outlets to which the gate corresponds in response to the flow of fluid into the housing from the inlet.

31 Claims, 14 Drawing Sheets

SEQUENTIALLY-GATED MULTI-PORT WATER DISTRIBUTION VALVE

FIELD OF THE INVENTION

The present invention relates generally to swimming pools, and more particularly to valves for use with pool pump assemblies in swimming pools having in-floor cleaning systems.

BACKGROUND OF THE INVENTION

There are many ways to clean a pool, but pool owners are continually looking for easier ways to do so. Pools can be cleaned by hand, such as by brushing the pool surface with a brush fit on the end of a long pole. This causes debris and material collected on the pool surface to be lifted off the surface; when the pool pump and filter assembly is operated in conjunction with this practice, water and debris together are drawn through the pool pump into a filter which filters and collects much of the debris, thereby removing it from the pool and rendering the pool cleaner. Brushing can be laborious and time-consuming, however.

Automatic pool vacuums were developed to reduce the work of pool owners. Pool vacuums operate in number of different ways, but most creep along the pool surface and suck, or disturb and then suck, debris and material collected on the pool surface up a hose into the operating pump and filter assembly. Vacuums can be difficult to operate, however. They must be calibrated to provide sufficient suction, they must be maintained, they are vulnerable to jamming from large debris, and they can provide a random cleaning pattern that may be inadequate.

In-floor cleaning heads were developed as an automated, low-oversight way to keep a pool surface clean. In-floor cleaning heads are outlets that are permanently installed in the swimming pool structure. The heads recede into the pool structure when not in use, and pop up when operating. Although there are a great number of kinds of pop-up heads, most operate with the basic functionality of directing a stream of water across a portion of the pool surface to clean that portion of the pool surface. Some heads rotate to direct that stream across different portions of the pool surface. Typically, the heads are installed in a number of locations across a pool surface, and often clusters of heads are grouped together in "lines," with each line including heads that receive water independently of the heads in other lines. This independent operation of lines requires a way to provide a flow of water to each line independently, and swimming pool distribution valves were developed. Swimming pool distribution valves generally have an inlet, a plurality of outlets, and some internal mechanism for directing the flow of water from the inlet to each of the outlets independently. However, many swimming pool distribution valves are susceptible to wear and can require difficult replacement. Others do not reliably provide sufficient water flow to operate a line of heads. Others have difficulty ensuring the flow of water to a line independently of other lines. An improved water distribution valve is needed.

SUMMARY OF THE INVENTION

A water distribution valve includes a housing having an inlet and a plurality of outlets. Gates are mounted in the housing, and each gate corresponds to one of the outlets. Each gate is mounted for reciprocal movement to alternately open and close the outlet to which the gate corresponds, thereby allowing or preventing the flow of water from moving through the outlet. A cam carried within the housing is mounted for rotation and imparts sequential and reciprocal movement to the gates in response to rotation of an impeller in the housing. In some embodiments, the cam and gates are carried in a replaceable cartridge applied to the housing.

BRIEF DESCRIPTION OF THE DRAWINGS

Referring to the drawings.

DETAILED DESCRIPTION

Figure 1A:
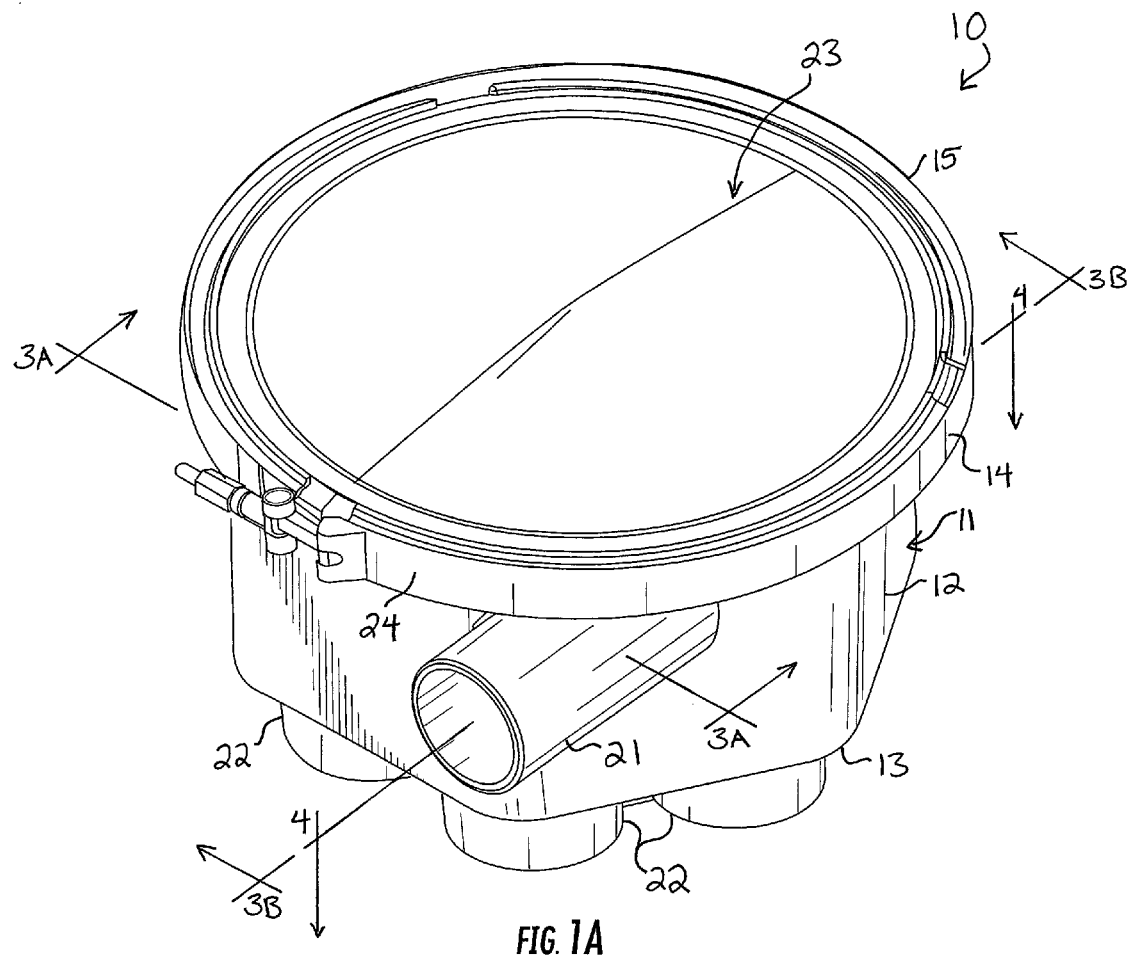
FIGS. 1A and 1B are top and bottoms perspective views of a sequentially-gated multi-port water distribution valve, respectively.
Figure 1B:
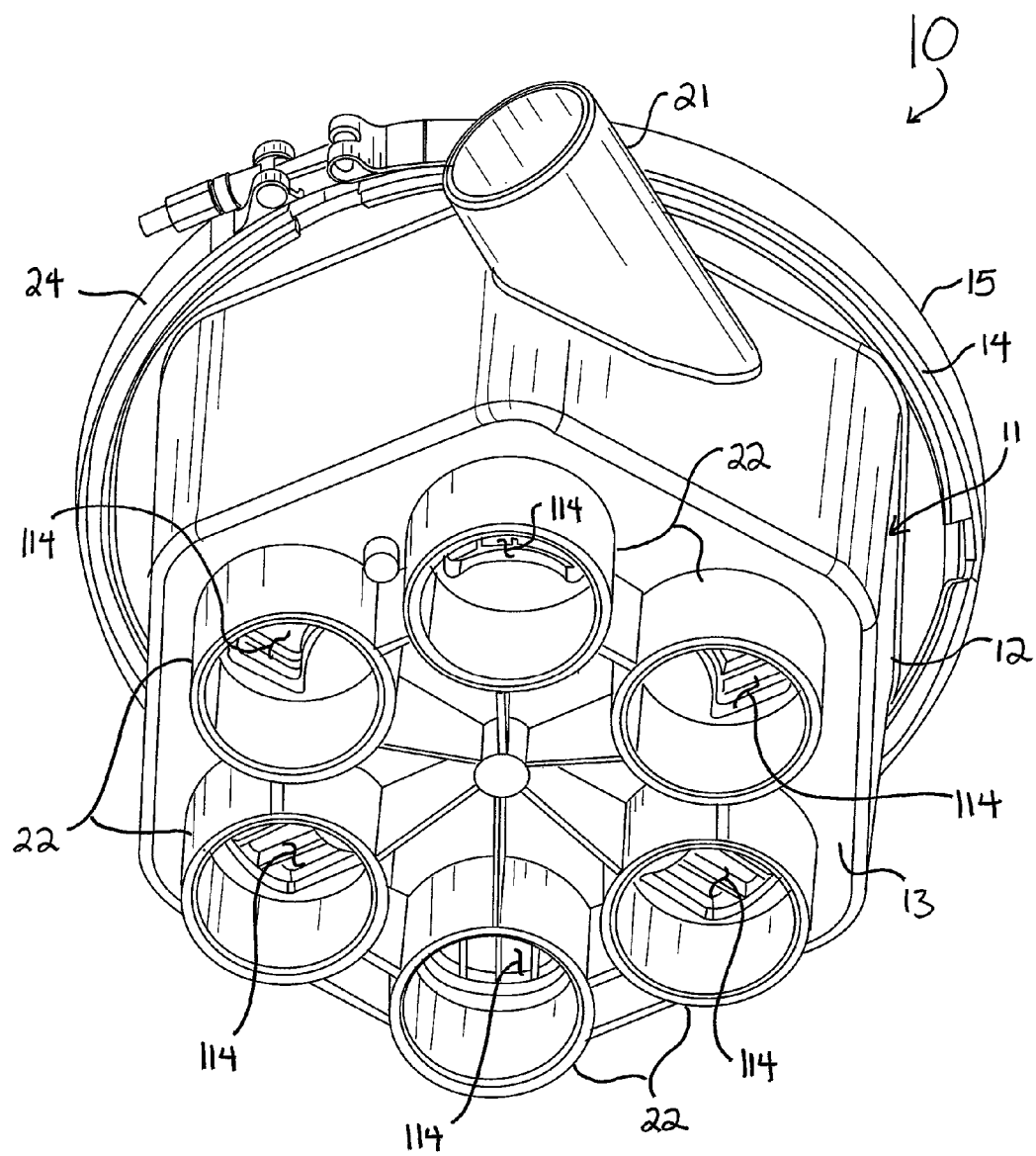

Reference now is made to the drawings, in which the same reference characters are used throughout the different figures to designate the same elements. FIGS. 1A and 1B illustrate a valve 10 for directing a flow of water from a pump in a swimming pool cleaning assembly among several outlets, typically coupled to in-floor cleaning heads installed in the swimming pool. The valve 10 is useful for sequentially communicating water to each in-floor cleaning head to clean the surface of a pool of dirt, debris, growth, and other material. As seen in FIGS. 1A and 1B, the valve 10 includes a generally symmetric housing 11 having a sidewall 12 extending between a bottom 13 and a lip 14 defining a top 15 of the housing 11. The housing 11 bounds an interior 20, shown in FIG. 2, and a lid 23 covers and encloses the interior 20 at the top 15. The lid 23 is releasably secured on the housing 11 with a clamp ring 24.

Referring still to FIGS. 1A and 1B, a lateral inlet 21 is formed in the sidewall 12 in fluid communication with the interior 20, and six downwardly-extending outlets 22 are formed in the bottom 13 of the housing 11, also in fluid communication with the interior 20. Each of the inlet 21 and outlets 22 are cylindrical ports sized to interface and engage easily with conventional swimming pool plumbing conduit. The pump of the swimming pool cleaning assembly pumps water down through the inlet 21 into the interior 20 and then sequentially out each of the outlets 22 to each of the in-floor cleaning heads installed in the swimming pool.

Figure 2:
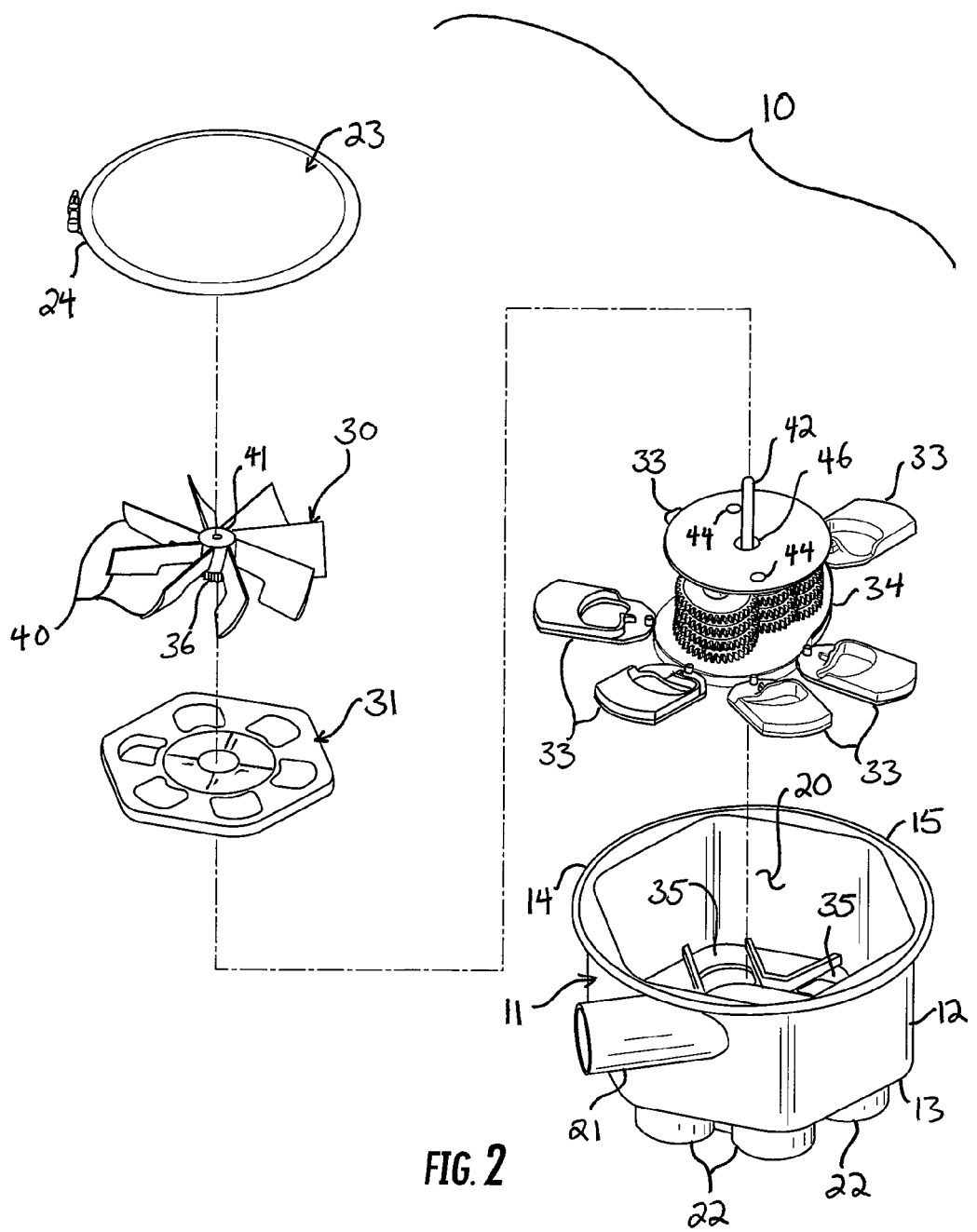
FIG. 2 is an exploded top perspective view of the valve of FIG. 1A.

The housing 11 and the lid 23 cooperate with structural elements and features carried in the interior 20 to sequentially and cyclically communicate water from the inlet 21 to each of the outlets 22 so that the surface of the swimming pool is cleaned. Referring to FIG. 2, such elements and features generally include an impeller 30, a plate 31, a reduction cassette 32, and a plurality of gates 33 mounted around a central cam 34 for reciprocal movement in tracks 35 formed in the bottom 13 of the housing 11 over each outlet 22, each gate 33 reciprocating between a retracted position, in which the corresponding outlet 22 over which the gate 33 reciprocates is closed, and an advanced position, in which the corresponding outlet 22 is opened to allow water to flow from the interior 20 out the outlet 22. The gates 23 are conventionally defined as moveable barriers for opening and closing an opening. The cam 34 converts rotational movement of the cam 34 into translational or reciprocal movement of the gates 33. In other words, rotation of the cam 34 imparts reciprocation to the gates 33.

Figure 3A:
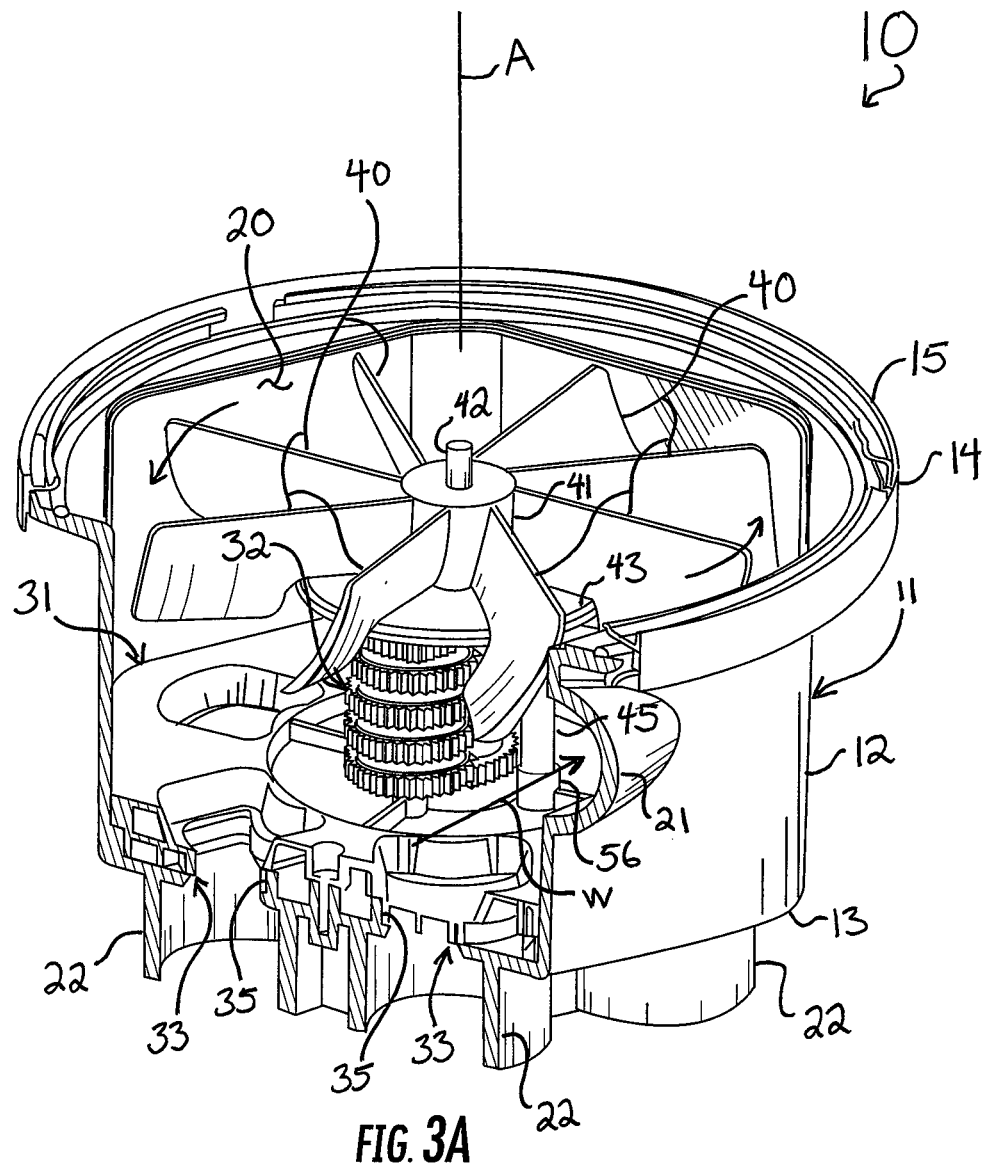
FIGS. 3A and 3B are front and side perspective, section views of the valve of FIG. 1A taken along the lines 3A-3A and 3B-3B in FIG. 1A, respectively.

FIG. 3A is a section view of the valve 10 taken along the line 3A-3A in FIG. 1A showing the valve 10 with the lid 23 removed for clarity of the illustration. FIG. 3A shows arrangement of parts within the housing 11. The impeller 30 is proximate to the top 15, generally parallel with respect to the inlet 21. The impeller 30 includes a plurality of canted blades 40 extending radially outward from a hub 41 mounted for rotation with an axle 42. The drawings show there are preferably eight blades 40, though one having ordinary skill in the art will readily appreciate that a fewer or greater number of blades 40 may be used so long as performance of the valve 10 is not diminished. The impeller 30 rotates on the axle 42 to drive the reduction cassette 32. Application of water through the inlet 21 along line W in FIG. 3A causes the impeller 30 to rotate in a counterclockwise manner, as indicated with rotational arrows in FIG. 3A, thereby imparting rotation to each gear of the reduction cassette 32. For purposes of orientation, the axle 42 is aligned along an axis A in FIG. 3A; various terms used herein will be used in reference to the axis A, such as "horizontal," which means perpendicular to the axis, "vertical," which means parallel to the axis A, and "radial," which means extending horizontally outwardly from the axis A. The hub 41 of the impeller 30 is free to rotate on the axle 42. It is noted that the sidewall 12 of the housing 11 has a hexagonal horizontal cross-section. The blades 40 each have a length in the radial direction which is shorter than the shortest radial distance between the axis A and the sidewall 12, such that the blades 40 can rotate without impact or interference with the sidewall 12, thereby ensuring the continuous, uninterrupted rotation of the impeller 30. On the underside of the hub 41 of the impeller 30 is carried a central gear 36 (shown in FIG. 2), which engages with the reduction cassette 32 to drive the reduction cassette 32, as will be described. The hub 41 is preferably integrally formed in the impeller 30, and the blades 40 are preferably integrally formed to the hub 41.

The impeller 30 is disposed above a disc 43. The disc 43 has a diameter less than the diameter of the impeller 30; the disc 43 is approximately one-third as wide as the housing 11. The disc 43 prevents the impeller 30 from moving downward on the axle 42 and also contains the reduction cassette 32. The disc 43 is formed with a coaxial bore 46 (seen in FIG. 2) through which the central gear 36 carried on the underside of the impeller 30 depends to engage with the reduction cassette 32. The disc 43 includes two sockets 44 (see FIGS. 3B and 4) for receiving posts 45, a central journal bearing 50 for receiving the axle 42, and two offset journal bearings 51 offset from the central journal bearing 50 for receiving two offset rotational shafts 52. The axle 42 and the offset rotational shafts 52 are thus confined by the disc 43 from lateral, or horizontal, movement and are allowed to rotate freely. The axle 42 and the offset rotational shafts 52 carry the gears of the reduction cassette 33.

A vertically-stacked set of central gears 53 of the reduction cassette 32 is mounted for free rotation on the axle 42. Two vertically-stacked sets of offset gears 54 of the reduction cassette 32 are disposed on either side of the central gears 53 and are mounted for free rotation on the offset rotational shafts 52. The central gears 53 are meshingly engaged with the offset gears 54 to form a reduction drive assembly that reduces the fast rotational speed of the impeller 30 to a slow rotational speed of the cam 34. The impeller 30, the reduction cassette 32, and the cam 34 are thus elements of a drive assembly carried by the housing 121 and operably coupled to each of the gates 33 so as to impart reciprocation to the gates 33 sequentially in response to application of water through the valve 10 and consequential actuation of the drive assembly.

Figure 3B:
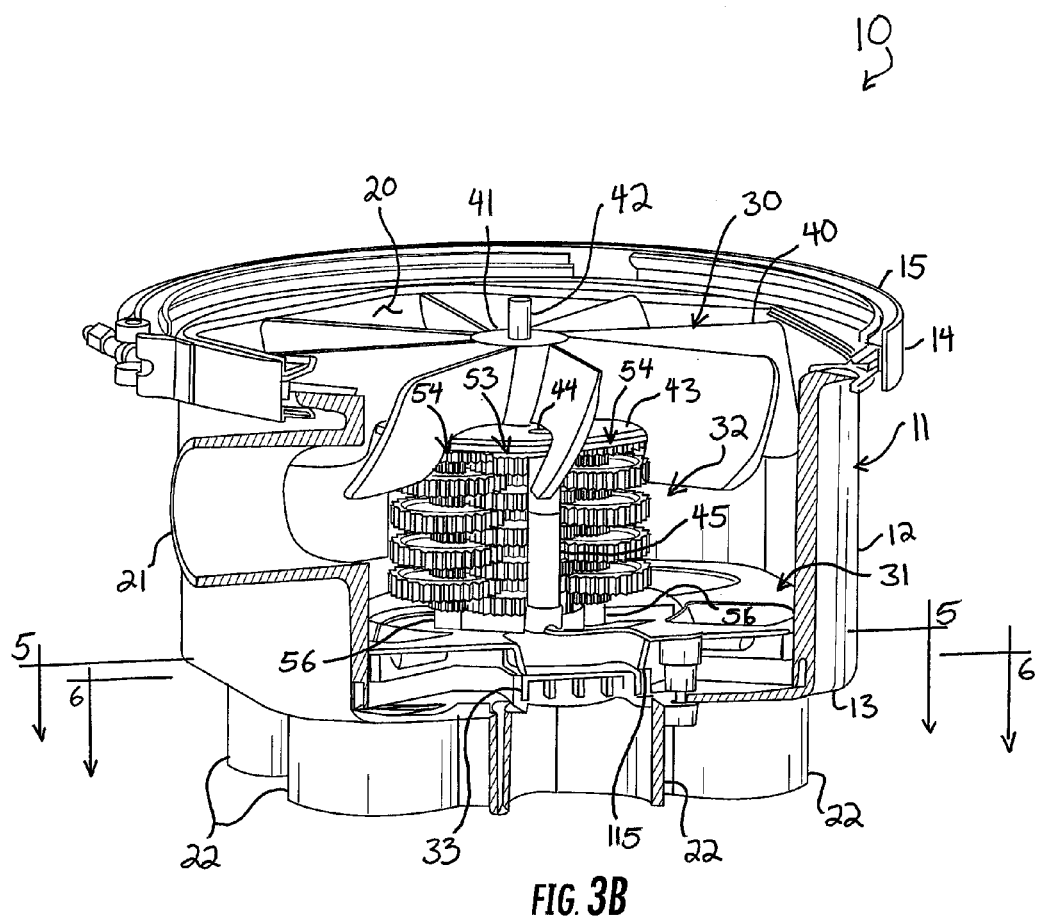
Figure 5:
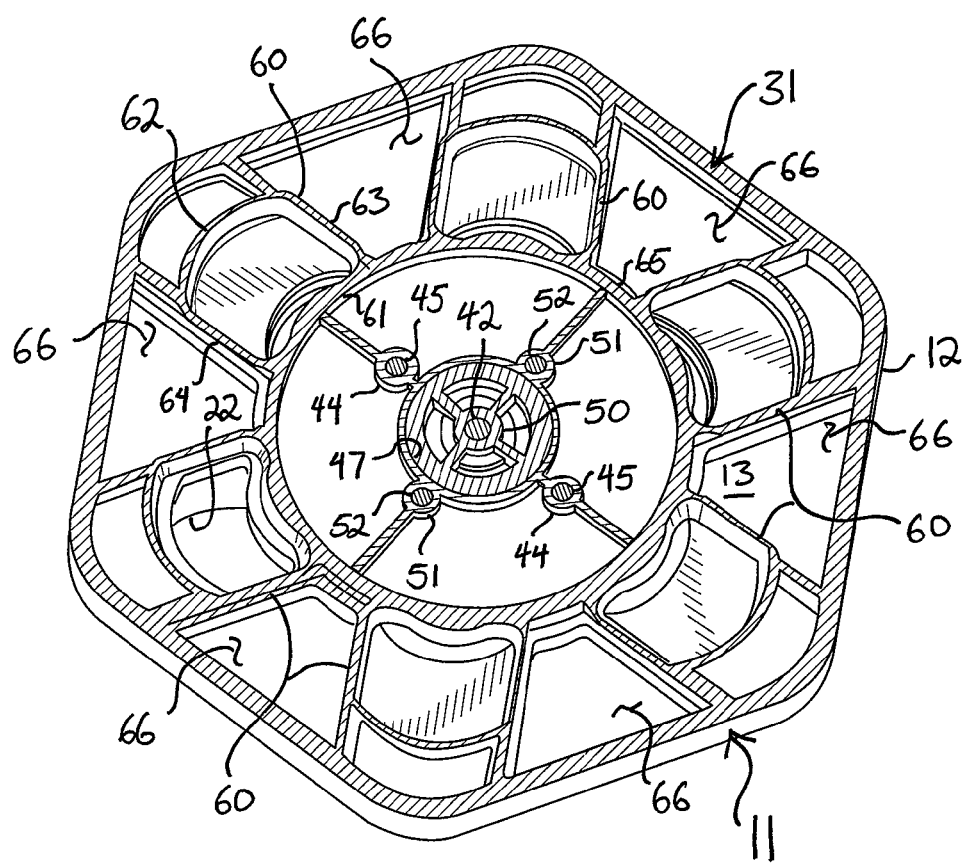
FIG. 5 is a top perspective, section view of the valve of FIG. 1A taken along the line 5-5 in FIG. 3B.

As seen in FIG. 3B, which is a section view taken along the line 3B-3B in FIG. 1A, the central gears 53 and the offset gears 54 are mounted just above the plate 31 on the axle 42 and the offset rotational shafts 52, respectively, which are secured in the plate 31 in sockets 56, respectively. The reduction cassette 32 is thus contained vertically between the disc 43 and the plate 31. FIG. 5 illustrates the relative arrangement of the axle 42, the sockets 44, the posts 45, central journal bearing 50, the offset journal bearing 51, and the offset rotational shafts 52.

Figure 4:
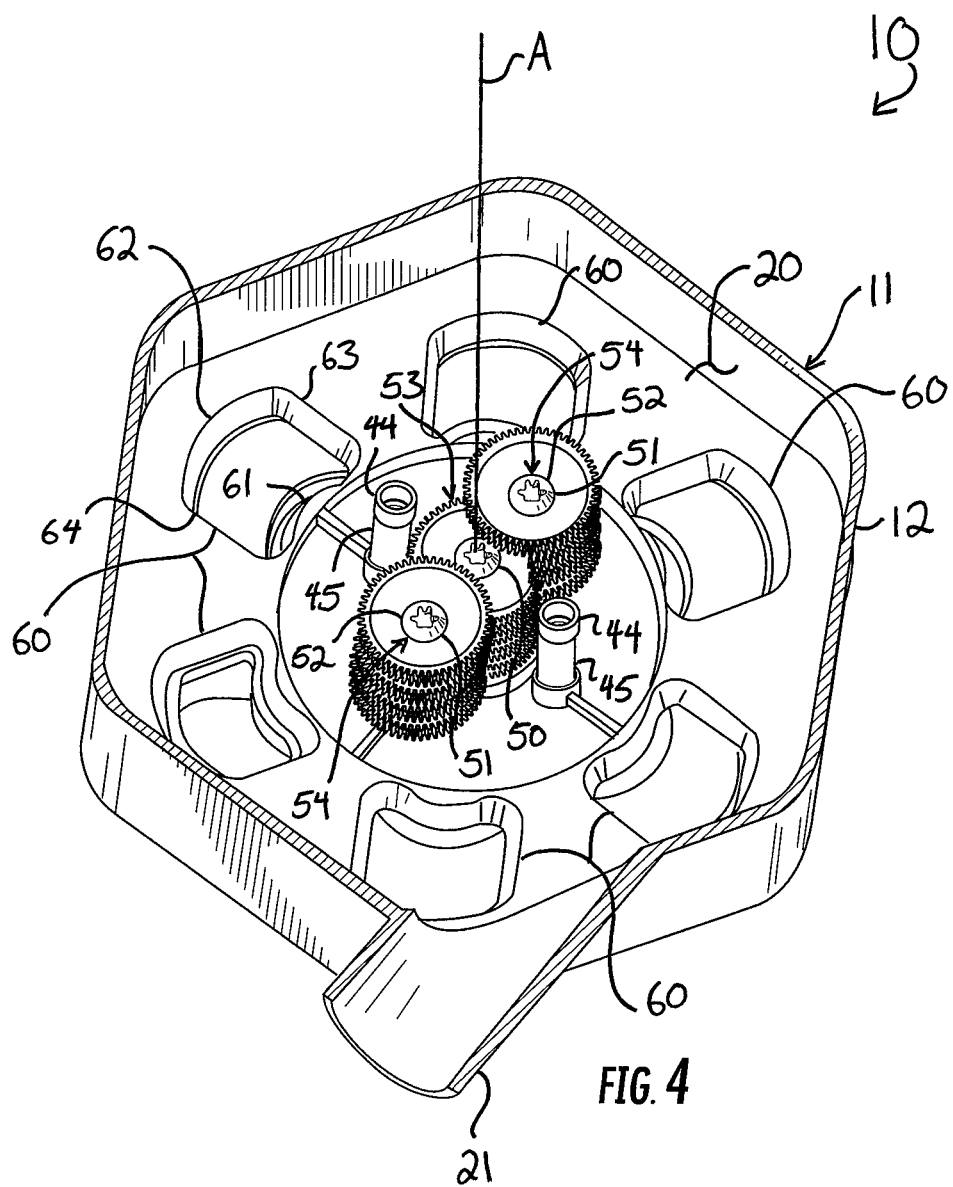
FIG. 4 is a top perspective, section view of the valve of FIG. 1A taken along the line 4-4 in FIG. 1A.

The gates 33 and cam 34 are contained underneath the plate 31. FIG. 4 is a section view just below the disc 31. FIG. 5 is a section view taken along line 5-5 in FIG. 3B and sections the plate 31. Taken together, FIGS. 4 and 5 show the plate 31, the bottom half of the plate 31, and the structures beneath the plate 31. The plate 31 is a hexagonal member with a relatively thin profile. The plate 31 is snug fit into the interior 20. While no rotational forces are imparted on the plate 31, it would be prevented from rotation by interaction with the sidewall 12 of the housing 11. Referring to FIG. 4, the plate 31 includes six apertures 60. The apertures 60 are identical in every way other than location, and so only one aperture 60 will be described and referenced herein specifically, with the understanding that the description is equally applicable to the other apertures 60, unless otherwise noted. The aperture 60 is generally rectangular and extends vertically entirely through the plate 31 from the interior 20 above the plate 31 to the interior 20 below the plate 31. The aperture has an inner edge 61, an opposed outer edge 62, and opposed parallel sides 63 and 64. The inner edge 61 and the outer edge 62 are each curved such that the inner edge 61 forms a convex edge of the aperture 60 and the outer edge 62 forms a concave edge of the aperture 60. The sides 63 and 64 are parallel and arranged nearly radially with respect to the axis A. The sides 63 and 64 are generally transverse to the inner and outer edges 61 and 62. Referring to FIG. 5, the inner edge 61 is proximate to a circular casing 65 in which the cam 34 (not shown) rotates; the inner edge 61 defines, in part, a circumference of the casing 65. The outer edge 62 is located approximately two-thirds between the inner edge 61 and the sidewall 12. As stated above, each of the apertures 60 is identical in structure. In location, the apertures 60 are spaced apart radially about the axle 42 and a coaxial circular opening 47, each separated by a roughly triangular void 66 extending between the casing 65 and the sidewall 12. The opening 47 extends vertically entirely through the plate 31.

Figure 6A:
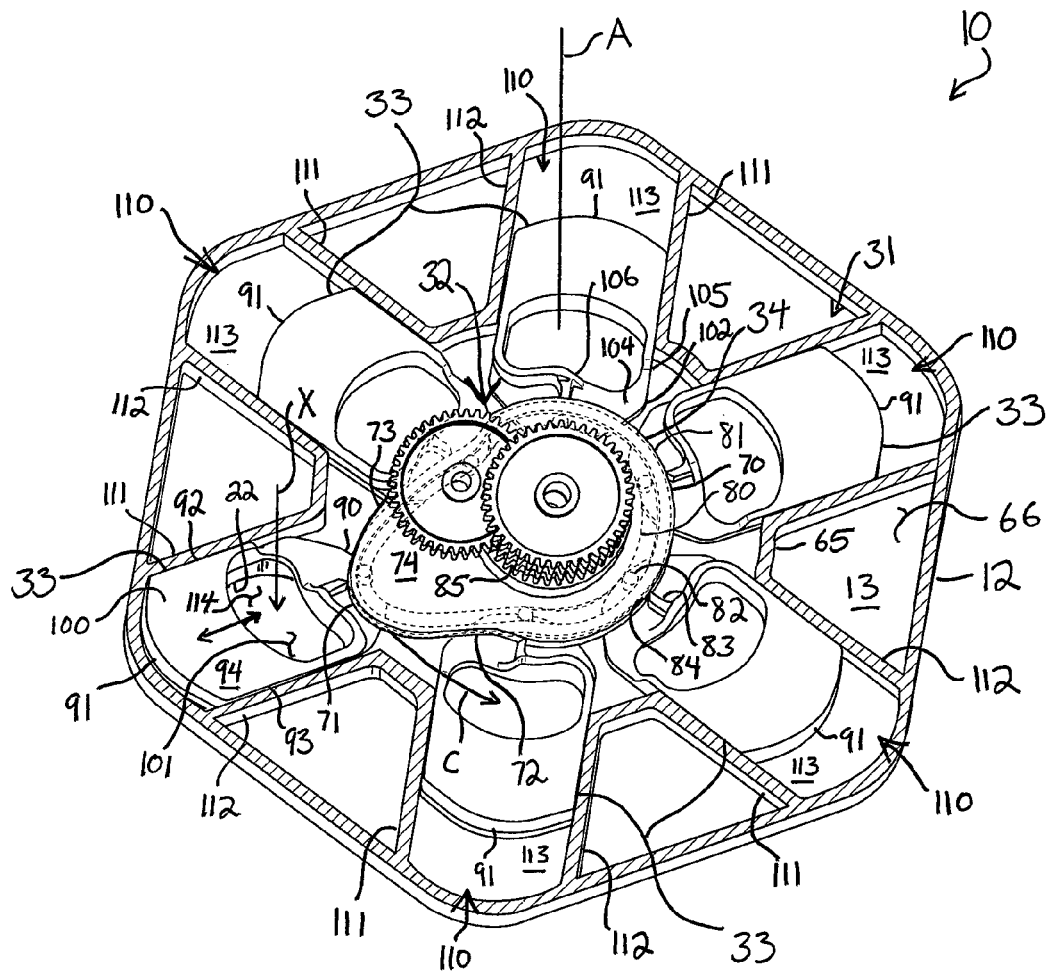
FIGS. 6A and 6B are top and bottom perspective, respectively, section views taken along the line 6-6 in FIG. 3B.

Referring now to FIG. 6A, which is a section view taken along the line 6-6 in FIG. 3B just above the gates 33, and which shows the cam 34 and a portion of the reduction cassette 32, the cam 34 is mounted for rotation in the casing 65 to impart reciprocal movement to each of the gates 33. The casing 65, shown in FIG. 6A as well as FIG. 5, is a shallow, cylindrical hold formed between the plate 31 and the bottom 13 of the housing 11 containing the cam 34. As described above, relatively fast rotation of the impeller 30 imparts rotation of the central and offset gears 53 and 54 of the reduction cassette 32, which impart reduced and relatively slow rotation to the cam 34, which sequentially urges each gate 33 into the advanced position thereof, so as to open the outlet 22 under the gate 33, and then draws back the gate 33 into the retracted position thereof, so as to close the outlet 22 under the gate 33. In this manner, the cam 34 controls the movement of each of the gates 33 and the opening and closing of each of the outlets 22, thereby directing the flow of water through the valve 10 from the inlet 21 to each of the outlets 22.

Figure 6B:
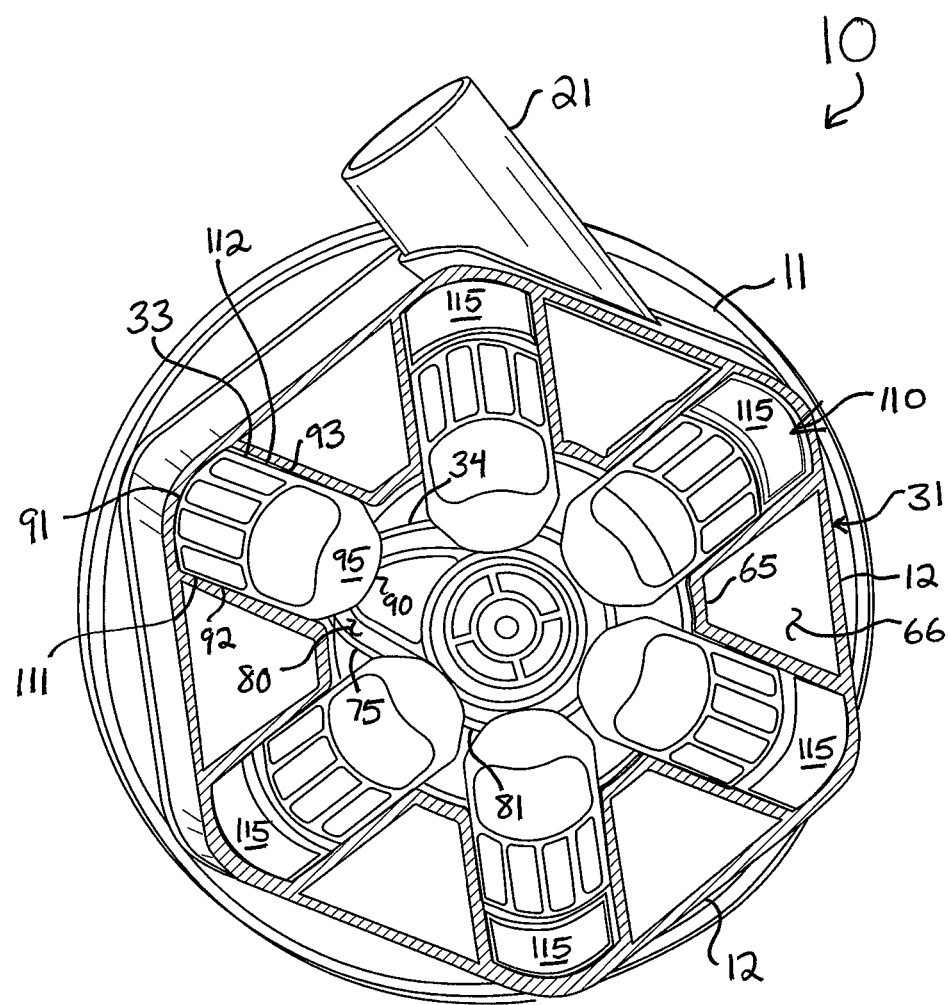
Figure 7:
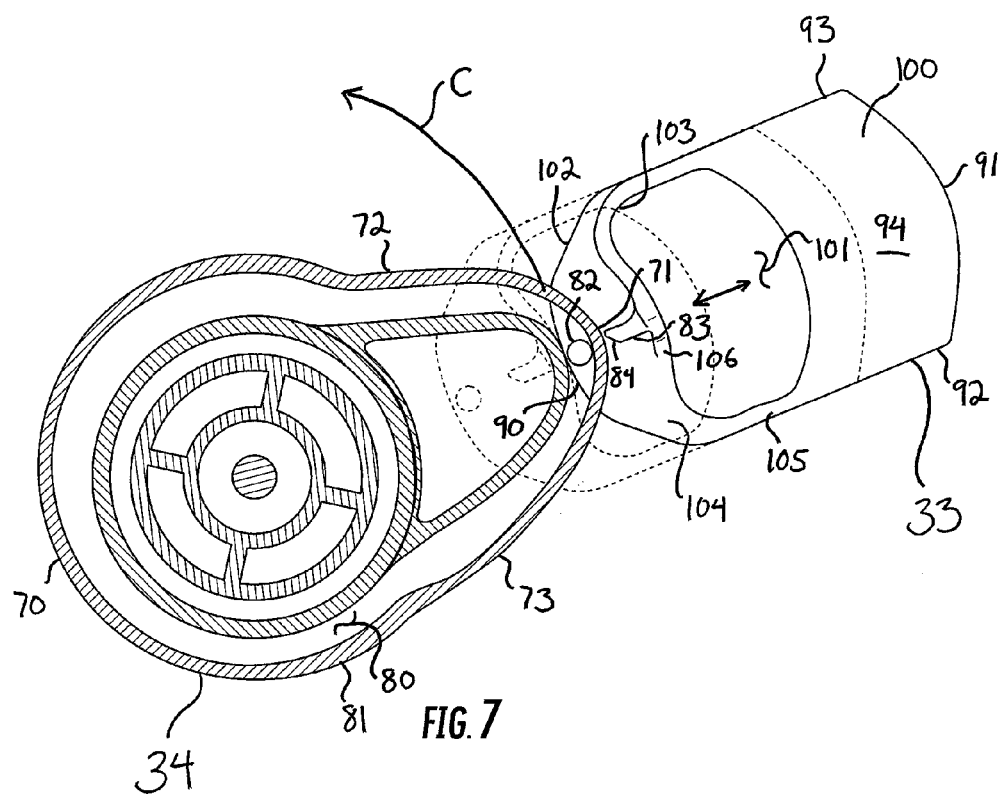
FIG. 7 is a section view taken along the line 6-6 in FIG. 3B showing, in isolation, a cam and a gate carried in the valve of FIG. 1A.

Referring now to FIGS. 6A and 7, the cam 34 is a low, flat rotating element having a quasi-circular heel 70, an opposed nose 71, a concave opening flank 72, and a convex closing flank 73. The heel 70, also known as the "base circle," of the cam 34 is the "lowest" point or minimal push point of the cam lobe. The nose 71 of the cam 34 is the maximum "lift" or push point of the cam 34. The opening flank 72 extends from the nose 71 to the heel 70 on one side of the cam 34, and the closing flank 73 extends from the nose 71 to the heel 70 on an opposed side of the cam 34. The opening flank 72 leads rotation, and the closing flank 73 trails rotation, as the cam 34 rotates in the direction indicated by arcuate arrowed line C. The cam 34 has a solid, flat, top surface 74, and an opposed open bottom surface 75 (shown in FIG. 6B). The cam 34 is relatively thin and disk-like in profile. A channel 80 is formed upwardly from the bottom surface 75, as seen in FIGS. 6A and 6B. The channel 80 is set in from a sidewall 81 of the cam 34 and extends continuously around the cam 34. The channel 80 has a constant width, and the sidewall 81 has a constant width, such that the channel 80 follows the contour of the heel 70, nose 71, opening flank 72, and closing flank 73 around the cam 34 by a constant inset distance. The channel 80 is a guide for pins 82 carried by the gates 33 which are set into the channel 80 and which correspond in diameter to the width of the channel 80, thus occupying the width of the channel 80. The cam 34 has an elevated integral gear 85 coaxial to an axis of rotation of the cam 34. When the valve 10 is assembled, the gear 85 extends through the opening 47 in the plate 31 so that it is disposed above the plate 31. The gear 85 meshingly engages with the gears of the reduction cassette 32.

There are a plurality of gates 33 carried by the valve 10. The drawings illustrate a preferred embodiment in which six gates 33 are used; the number of gates 33 corresponds to the number of outlets 22. The gates 33 are identical in every way other than location, and so only one gate 33 will be described and referenced herein specifically, with the understanding that the description is equally applicable to the other gates 33, unless otherwise noted. FIGS. 6A and 6B illustrate the gates 33 from above and below; FIG. 6B is a section view taken along the same line 6-6 as FIG. 6A, however, FIG. 6B shows the section view inverted, viewing the valve 10 from below rather than above. Thus, FIGS. 6A and 6B illustrate the section from opposite directions. FIG. 7 additionally shows the gate 33 in detail. The gate 33 has a generally rectangular body with a proximal end 90, a distal end 91, two opposed, parallel sides 92 and 93 extending between the proximal and distal ends 90 and 91, an upper surface 94, and an opposed lower surface 95. The gate 33 has a solid portion, or block 100 extending between the distal end 91 and generally intermediate between the proximal and distal ends 90 and 91. An open portion, or port 101, extends between the block 100 and proximate to the proximal end 90. The gate 33 has a relative thickness across the block 100 and port 101. Finally, a low tab 102, being relatively thin compared with the block 100 and port 101, extends proximally from the port 101 to the proximal end 90. The pin 82 is here carried on the tab 102, projecting upward to be received in the channel 80 of the cam 34.

The port 101 is defined by a wall 103 substantially bounding the port 101, transitioning into, and formed integrally to the block 100. A laterally-extending finger 83, formed integrally to the tab 102, extends radially inwardly toward the pin 82; the sidewall 81 of the cam 34 is fit between the pin 82 and the finger 83. The finger 83 has a diagonal inner face 84, allowing the sidewall 81 to rock against the finger 83 as the cam 34 rotates. The inner face 84 is diagonally canted toward a corner 104 of the port 101. The corner 104 of the port 101 is flat, low, and flush with the tab 102. Two opposed ramps 105 and 106, transition out of the corner 104 from the low tab 102 to the wall 103 around the port 101. The ramps 105 and 106 are each inclined obliquely from the tab 102 to the wall 103. The ramps 105 and 106 are offset transversely with respect to each other; the ramp 105 is proximate to and parallel to the side 92, and the ramp 106 is proximate to and parallel to the proximal end 90. The finger 83 extends outwardly from the wall 103 at the ramp 106. With the corner 104 disposed between the ramps 105 and 106, the corner 104 defines a low point around the port 101 through which the nose 71 of the cam 34 can move as the cam 34 rotates. As stated above, each of the gates 33 is identical in structure. In location, the gates 33 are spaced apart radially about the axle 42, each separated by the roughly triangular voids 66 extending between the casing 65 and the sidewall 12.

Referring to FIG. 6A still, five of the gates 33 are shown in the retracted position, in which the distal end 91 of each gate 33 is retracted radially toward the cam 34, and the gates 33 close the outlets 22. One of the gates 33 is shown in the advanced position, in which the distal end 91 is advanced away from the cam 34, and the gate 33 open the outlet 22. The gates 33 move between the retracted and advanced positions in a track 110 formed in the bottom 13.

Still referring to FIG. 6A, the bottom 13 is formed with six tracks 110 extending radially outward from the axis A. Each of the tracks 110 is identical in every way other than location and orientation, and so only one of the tracks 110 will be described and referenced herein specifically, with the understanding that the description is equally applicable to the other tracks 110, unless otherwise noted. The track 110 is a shallow channel formed between two opposed radial walls 111 and 112 and terminating at the sidewall 12. The walls 111 and 112 are spaced apart from each other by a constant distance just greater than the width of a gate 33 between the opposed sides 92 and 93 of the gate 33. The walls 111 and 112 are formed integrally to the bottom 13 and project upwardly a short height just greater than the thickness of the gates 33 at the faces 100 of the gates 33. The bottom 13 has an inner, upper surface 113 which is smooth and flat, and along which the gate 33 reciprocates in sliding contact. The lower surface 95 of the gate 33 slides in direct contact along the upper surface 113 of the bottom 13 with low friction. Opposed from the upper surface 113 is a lower surface 115 of the plate 31 (seen in FIGS. 3B and 6B), which defines the top of the track 110 and against which the upper surface 94 of the gate 33 reciprocates in sliding contact. The upper surface 94 of the gate 33 slides in direct contact along the lower surface 115 of the plate 31 with low friction. In this manner, the gate 33 is contained within the track 110 by the walls 111 and 112, the upper surface 113 of the bottom 13, the lower surface 115 of the plate 31, the sidewall 12 of the housing 11, and the sidewall 81 of the cam 34.

An aperture 114 is formed in each track 110, and there are thus six apertures 114 in the preferred embodiment of the valve 10. The apertures 114 in the tracks 110 are aligned axially with the apertures 60 in the plate 31, such that each aperture 114 corresponds to a corresponding one of the apertures 60 and is sequentially coupled and decoupled in fluid communication with the corresponding aperture 60 by reciprocal movement of the gate 33 carried in the track 110 in which the aperture 114 is formed. One of the apertures 114 is partially visible in FIG. 6A, and all of the apertures 114 are visible, to some extent, in FIG. 1B. Like the apertures 60, the apertures 114 are generally rectangular and extend vertically entirely through the bottom 13 from the upper surface 113 to the underside of the bottom 13. Each aperture 114 has an inner edge, an opposed outer edge, and opposed parallel sides. The inner edge and the outer edge are each curved such that the inner edge forms a convex edge of the aperture 114 and the outer edge forms a concave edge of the aperture 114. The sides are parallel and arranged nearly radially with respect to the axis A. The sides are generally transverse to the inner and outer edges. The inner edges are proximate to the casing, and the outer edges are located approximately two-thirds between the inner edge and the sidewall 12. As stated above, each of the tracks 110 is identical in structure. In location, the tracks 110 are spaced apart radially about the axle 42, each separated by the roughly triangular void 66. Within these tracks 100, the gates 33 reciprocate in response to rotation of the cam 34.

Referring to FIG. 3A, as water enters the valve 10 along arrowed line W, the impeller 30 rotates in a counter-clockwise rotation, causing the central and drive offset gears 53 and 54 in the reduction cassette 32 to rotate. The flow of water impacts the impeller 30, causing the impeller 30 to rotate. A portion of the water moves up between the impeller 30 and the lid 23, and another portion of the water moves down forward the plate 31. The reduction cassette 32, engaged with the cam 34, causes the cam 34 to rotate, albeit much more slowly than the impeller 30. Now referring to FIG. 6A, rotation of the cam 34 causes the nose 71 of the cam 34 to move in counter-clockwise rotation along arrowed line C. As the nose 71 of the cam 34 rotates over a gate 33, the nose 71 first moves over the tab 102 and then into the corner 104. The pin 82 is fit into the channel 80 of the cam 34, and the sidewall 81 of the cam 34 is fit between the pin 82 and the finger 83. As the cam 34 continues to rotate toward alignment with the gate 33, the nose 71 moves into the track 110. The pin 82, carried in the channel 80, is urged radially outward, as the portion of the channel 80 in which the pin 82 is moving into at the tip of the nose 71 is moved radially outward into the track 110. The pin 82, carried integrally on the gate 33, causes the gate 33 to slide radially outward, thereby moving the port 101 in the gate 33 between the apertures 60 and 114 in the plate 31 and the track 110, respectively. When the cam 34 has rotated such that the cam 34 is aligned with the gate 33 in the track 110 and the pin 82 is at the tip of the nose 71, the gate 33 is fully moved into the advanced position thereof, and the port 101 is aligned with the apertures 60 and 114, thus coupling the apertures 60 and 114 in fluid communication and opening the outlet 22 below the gate 33. Water moving through the housing 11 can therefore exit the valve through this alignment of the aperture 60, the port 101, the aperture 114, and the outlet 22, along the line X in FIG. 6A.

When the one of the gates 33 is fully in the advanced position opening the outlet 22 below it, the other gates 33 are each fully in the retracted position thereof. As shown in FIG. 6A, when the nose 71 is aligned with the one of the gates 33, each of the pins 82 of the other gates 33 is held close to the axis A in the channel 80 which is circular around the heel 70 of the cam 34. Thus, only one outlet 22 is fully opened at a time. The ports 101 of the other gates 33 are misaligned with the aperture 60 in the plate 31 and the aperture 114 in the bottom 13 of the housing 11, thereby decoupling the apertures 60 and 114 from fluid communication with each other and closing the outlet 22 below the gate 33. As water continues to enter the valve 10 and spin the impeller 30, the cam 34 continues to move in counter-clockwise rotation. As the cam 34 moves the nose 71 out of alignment with the one of the gates 33, the nose 71 moves into the next gate 33. This next gate slowly begins to be urged radially outward, as the one of the gates 33 moves radially inward. Thus, the one of the gates 33 and this next gate 33 do both partially open their respective outlets 22 for a small portion of time. However, the concave shape of the leading flank 72 and the convex shape of the closing flank 73 minimize this portion of time in which two outlets 22 are both open; the concave shape of the opening flank 72 delays opening of the "leading" outlet 22 and the convex shape of the closing flank 73 quickens opening of the "trailing" outlet 22 more so than would be true with a symmetric cam 34.

In this way, each outlet 22 is sequentially opened and closed, as the corresponding gate 33 above the outlet 22 reciprocates between the advanced position and the retracted position, respectively, and water is pumped to in-floor cleaning heads installed throughout the pool.

FIGS. 8-10B illustrate a second embodiment of a valve 120 for directing a flow of water from a pump in a swimming pool cleaning system among several outlets, typically coupled to in-floor cleaning heads installed in the swimming pool. The valve 120 is similar, but not identical, in construction to the valve 10, and is useful for sequentially communicating water to each in-floor cleaning head to clean the surface of a pool of dirt, debris, growth, and other material. As such, many of the same reference characters used to designate structural elements and features of the valve 120 are identical to corresponding structural elements and features of the valve 10, but the reference characters used in association with the valve 120 will be marked with a prime symbol ("'") so as to differentiate them from those of the valve 10. It should be further understood that in some cases, descriptions and illustrations of various structural elements and features and the arrangement thereof in valve 120 may be omitted for clarity, as reference to corresponding identical structural elements and features in valve 10 should provide adequate description.

Figure 8:
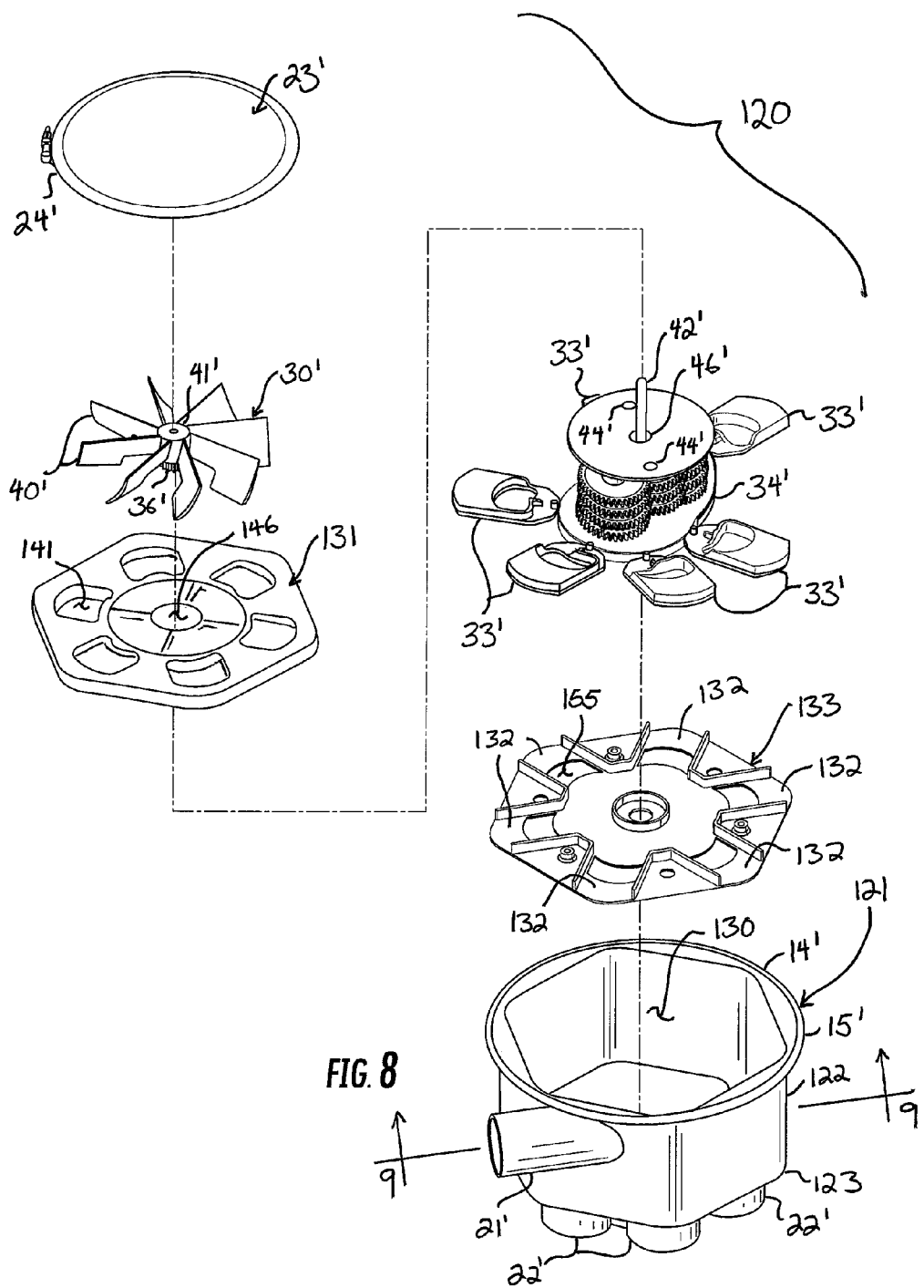
FIG. 8 is an exploded top perspective view of an embodiment of a sequentially-gated multi-port water distribution valve.

From the outside, the valve 120 appears identical to the valve 10 shown in FIGS. 1A and 1B. Referring to FIG. 8, which is an exploded view of the valve 120, the valve 120 includes a generally symmetric housing 121 having a sidewall 122 extending between a bottom 123 and a lip 14' defining a top 15' of the housing 121. The housing 121 bounds an interior 130 of the housing 121, and a lid 23' covers and encloses the interior 130 at the top 15'. The lid 23 is releasably secured on the housing 121 with a clamp ring 24'.

A lateral inlet 21' is formed in the sidewall 122 in fluid communication with the interior 130, and six downwardly-extending outlets 22' are formed in the bottom 123 of the housing 121, also in fluid communication with the interior 130. Each of the inlet 21' and outlets 22' are cylindrical ports sized to interface and engage easily with convention swimming pool plumbing conduit. The pump of the swimming pool cleaning assembly pumps water down through the inlet 21' into the interior 130 and then sequentially out each of the outlets 22' to each of the in-floor cleaning heads installed in the swimming pool.

The housing 121 and the lid 23' cooperate with structural elements and features carried in the interior 130 to sequentially and cyclically communicate water from the inlet 21' to each of the outlets 22' so that the surface of the swimming pool is cleaned. Referring to FIG. 8, such elements and features generally include an impeller 30', a top plate 131, a reduction cassette 32', and a plurality of gates 33' mounted around a central cam 34' for reciprocal movement in tracks 132 formed and defined between a bottom plate 133 and the top plate 131. The cam 34' of the valve 120 is identical to the cam 34 of the valve 10, and the gates 33' are identical to the gates 33. Each gate 33' reciprocates between a retracted position, in which the corresponding outlet 22' over which the gate 33' reciprocates is closed, and an advanced position, in which the corresponding outlet 22' is opened to allow water to flow from the interior 130 out the outlet 22'.

Figure 9:
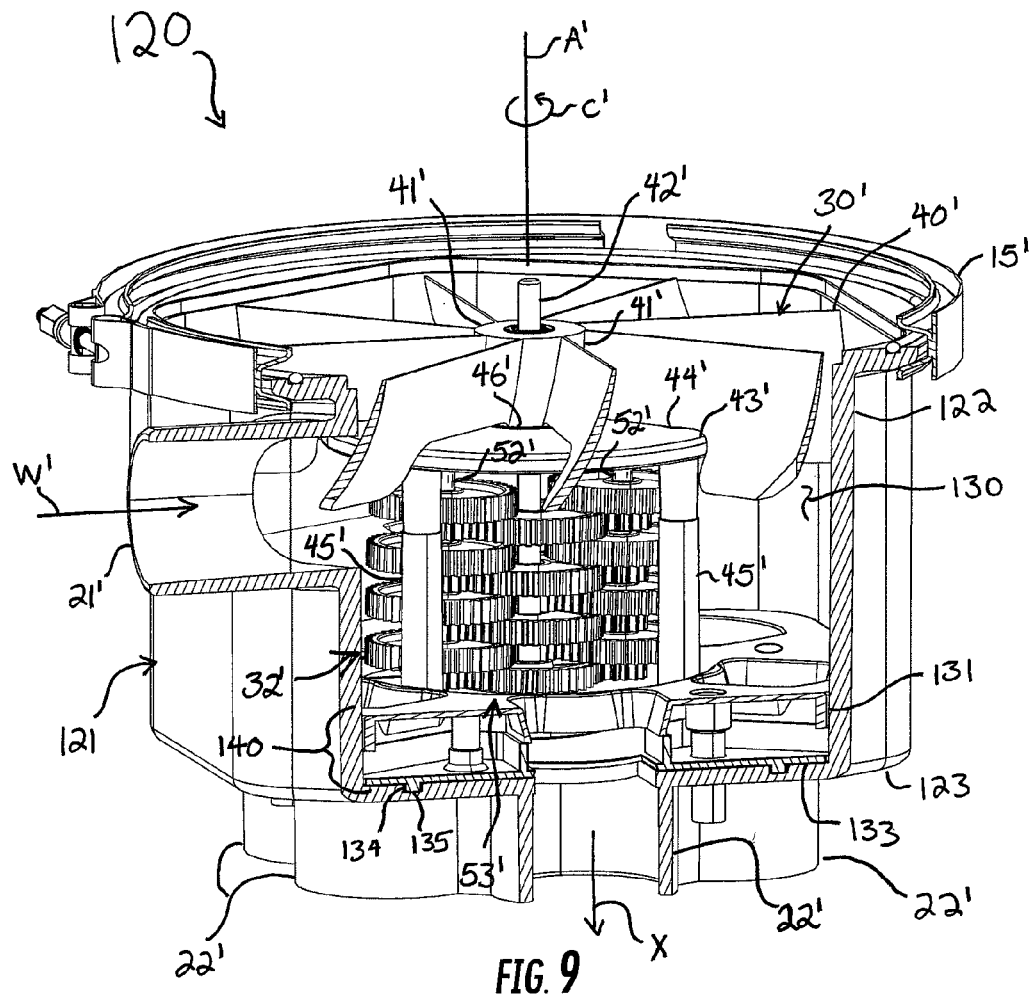
FIG. 9 is a side perspective, section view of the valve of FIG. 8 taken along the line 9-9 in FIG. 8.

FIG. 9 is a section view of the valve 120 taken along the line 9-9 in FIG. 8 showing the valve 120 with the lid 23' removed for clarity of the illustration. FIG. 9 shows arrangement of parts within the housing 121. The impeller 30' is proximate to the top 15', generally parallel with respect to the inlet 21'. The impeller 30' will not be described in detail because it is identical to the impeller 30 of the valve 10, and the description of the structure of the impeller 30 applies equally to the impeller 30'. Nevertheless, the impeller 30' includes canted blades 40', a hub 41', an axle 42', and an axis A'. The impeller 30' drives the reduction cassette 32' in response to application of water through the inlet 21', as with the valve 10. The sidewall 122 of the housing 121 has a hexagonal horizontal cross-section. The blades 40' each have a length in the radial direction which is shorter than the shortest radial distance between the axis A' and the sidewall 122, such that the blades 40' can rotate without impact or interference with the sidewall 122, thereby ensuring the continuous, uninterrupted rotation of the impeller 30'. On the underside of the hub 41' of the impeller 30' is carried a central gear 36' (shown in FIG. 8), which engages with the reduction cassette 32', as will be described.

The impeller 30' is disposed above a disc 43'. The impeller 30', the disc 43', and surrounding structure will not be described in detail because they are described with respect to the valve 10, and the description of such structure applies equally to the valve 120. Nevertheless, the disc 43' includes a diameter less than the diameter of the impeller 30', a central coaxial bore 46', sockets 44' for receiving posts 45', and rotational shafts 52' are offset therefrom. The axle 42' and the offset rotational shafts 52' carry the gears of the reduction cassette 33.

Still referring to FIG. 9, the reduction cassette 32' includes a vertically-stacked set of central gears 53' meshingly engaged with two vertically-stacked sets of offset gears 54' to form a reduction drive assembly that reduces the fast rotational speed of the impeller 30' to a slow rotational speed of the cam 34'. The central gears 53' and the offset gears 54' are mounted just above the top plate 131 on the axle 42' and the offset rotational shafts 52', respectively, both of which are secured in the top plate 131. The reduction cassette 32' is thus contained vertically between the disc 43' and the top plate 131.

Figure 10A:
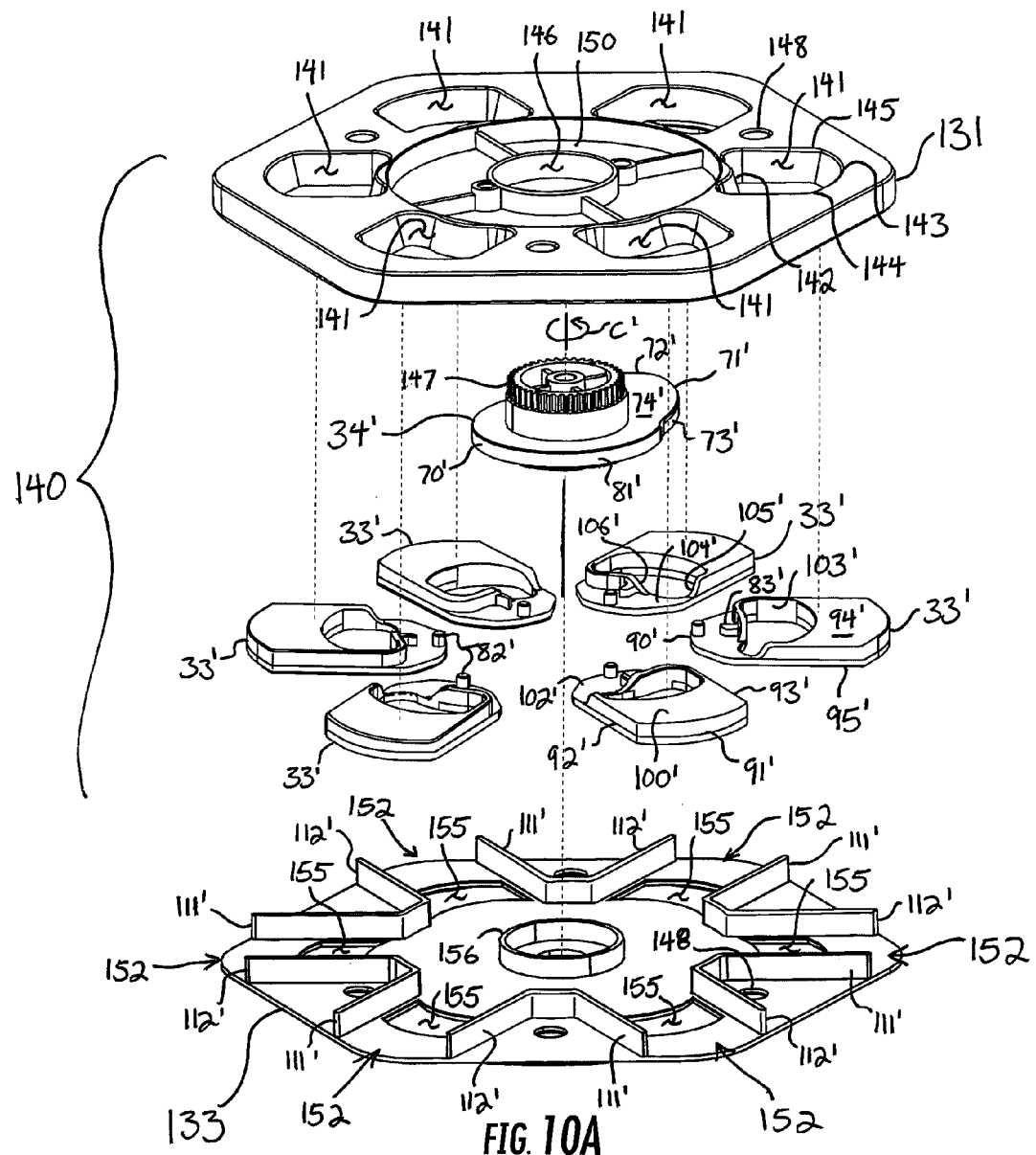
FIGS. 10A and 10B are exploded, top and bottom perspective views of a cartridge of the valve of FIG. 8, respectively.
Figure 10B:
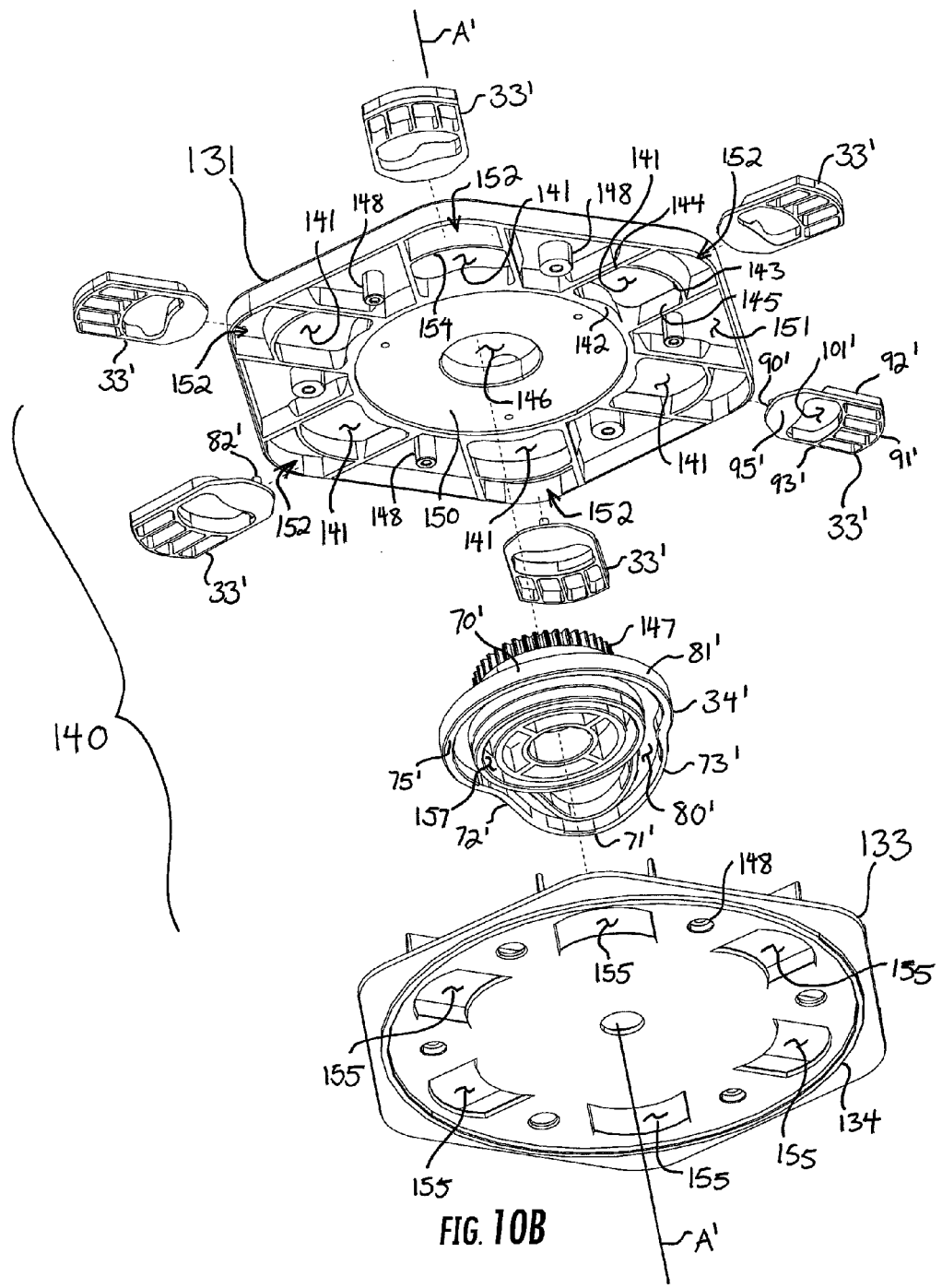

The gates 33' and the cam 34' are contained between the top plate 131 and the bottom plate 133. The top plate 131, the bottom plate 133, and the gates 33' and cam 34' are shown in greater detail in the isolated, exploded top and bottom perspective views of FIGS. 10A and 10B. Referring to FIGS. 10A and 10B, the top plate 131, the bottom plate 133, and the gates 33' and cam 34' define a cartridge 140 which is applicable to the valve 120 to render the valve 120 operable. The cartridge 140 is removable so that it may be replaced with a new cartridge if constituent parts of the cartridge 140 wear out or fail. The top and bottom plates 131 and 133 bound and limit the gates 33' and cam 34' from movement in a vertical direction, so that the gates 33' and cam 34' can only move in directions parallel to the top and bottom plates 131 and 133. The cartridge 140 is snug fit into the housing 121 and then fastened to the bottom 123 of the housing 121 to secure the cartridge 140 therein. An annular tongue 134 depending from the bottom plate 133 snug fits into an annular groove 135 (shown in FIG. 9) and provides a seal against the intrusion of water between the cartridge 140 and the bottom 123 of the housing, thereby preventing water from moving around the cartridge 140 and out the outlets 22'.

The top plate 131 is a hexagonal member with a relatively thin profile. The top plate 131 is snug fit into the interior 130 as part of and together with the cartridge 140. Referring to FIGS. 10A and 10B still, the top plate 131 includes six apertures 141. The apertures 141 are identical in every way other than location, and so only one aperture 141 will be described and referenced herein specifically, with the understanding that the description is equally applicable to the other apertures 141, unless otherwise noted. Additionally, not every aperture 141 will be marked with reference characters, for the sake of clarity of the illustration. The aperture 141 is generally rectangular and extends vertically entirely through the top plate 131. The aperture 141 has an inner edge 142, an opposed outer edge 143, and opposed parallel sides 144 and 145. The inner edge 142 and the outer edge 143 are each curved such that the inner edge 142 forms a convex edge of the aperture 141 and the outer edge 143 forms a concave edge of the aperture 141. The sides 144 and 145 are parallel and arranged nearly radially with respect to the axis A'. The sides 144 and 145 are generally transverse to the inner and outer edges 142 and 143. The inner edge 142 is proximate to a circular casing 150 in which the cam 34' rotates; the inner edge 142 defies, in part, a circumference of the casing 150. The outer edge 143 is located approximately two-thirds between the inner edge 142 and the sidewall 122, when applied to the housing 121, as in FIG. 9. As stated above, each of the apertures 141 is identical in structure. In location, the apertures 141 are spaced apart radially about a circular opening 146, each separated by a roughly triangular void 151. The opening 146 extends vertically entirely through the top plate 131.

The cam 34' is mounted in the casing 150 to impart reciprocal movement to each of the gates 33'. Though not shown in the exploded view of FIGS. 10A and 10B, the cam 34' is mounted for rotation on the axle A'. The casing 150 is a shallow, cylindrical hold formed between the top plate 131 and the bottom plate 133 of the cartridge 140 containing the cam 34', and has at its center the opening 146. As described above, relatively fast rotation of the impeller 30' imparts rotation of the central and offset gears 53' and 54 of the reduction cassette 32', which imparts reduced and relatively slow rotation of the cam 34', which sequentially urges each gate 33' into the advanced position thereof, so as to open the outlet 22' under the gate 33', and then draws back the gate 33' into the retracted position thereof, so as to close the outlet 22' under the gate 33'. In this manner, the cam 34' controls the movement of each of the gates 33' and the opening and closing of each of the outlets 22', thereby directing the flow of water through the valve 120 from the inlet 21' to each of the outlets 22'.

Like the cam 34, the cam 34' has a quasi-circular heel 70', an opposed nose 71', a concave opening flank 72', and a convex closing flank 73'. The opening flank 72' leads rotation, and the closing flank 73' trails rotation, as the cam 34' rotates in the direction indicated by arcuate arrowed line C' in FIG. 10A. The cam 34' has a solid, flat, top surface 74' (shown in FIG. 10A), and an opposed open bottom surface 75' (shown in FIG. 10B). A channel 80' is formed upwardly from the bottom surface 75'. The channel 80' is set in from a sidewall 81' of the cam 34' and extends continuously around the cam 34'. The channel 80' has a constant width, and the sidewall 81' has a constant width, such that the channel 80' follows the contour of the heel 70', nose 71', opening flank 72', and closing flank 73' around the cam 34' by a constant inset distance. The channel 80' is a guide for pins 82' carried by the gates 33' which are set into the channel 80' and which correspond in diameter to the width of the channel 80', thus occupying the width of the channel 80'. The cam 34' is bound between the top and bottom plates 131 and 133. The cam 34' has an elevated integral gear 147 coaxial to an axis of rotation of the cam 34'. When the cartridge 140 is assembled with the top plate 131 coupled to the bottom plate 133, the gear 147 extends through the top plate 131 so that it is disposed above the top plate 131. The gear 147 meshingly engages with the gears of the reduction cassette 32'.

There are a plurality of gates 33' carried by the valve 120. The drawings illustrate a preferred embodiment in which six gates 33' are used; the number of gates 33' corresponds to the number of outlets 22'. The gates 33' are identical in every way other than location, and so only one gate 33' will be described and referenced herein specifically, with the understanding that the description is equally applicable to the other gates 33', unless otherwise noted. FIGS. 10A and 10B illustrate the gates 33' from above and below. The gate 33' has a generally rectangular body with a proximal end 90', a distal end 91', two opposed, parallel sides 92' and 93' extending between the proximal and distal ends 90' and 91', an upper surface 94', and an opposed lower surface 95'. The gate 33' has a solid portion, or block 100' extending between the distal end 91' and generally intermediate between the proximal and distal ends 90' and 91'. An open portion, or port 101', extends between the block 100' and proximate to the proximal end 90'. The gate 33' has a relative thickness across the block 100' and the port 101'. Finally, a low tab 102', being relatively thin compared with the block 100' and port 101', extends proximally from the port 101' to the proximal end 90'. The pin 82' is here carried on the tab 102', projecting upward from the tab 102' to be received in the channel 80' of the cam 34'.

The port 101' is defined by a wall 103' substantially bounding the port 101', transitioning into, and formed integrally to the block 100'. A laterally-extending finger 83', formed integrally to the tab 102', extends radially inwardly toward the pin 82'; the sidewall 81' of the cam 34' is fit between the pin 82' and the finger 83'. The finger 83' has a diagonal inner face, allowing the sidewall 81' to rock against the finger 83' as the cam 34' rotates. The inner face of the finger 83' is diagonally canted toward a corner 104' of the port 101'. The corner 104' of the port 101' is flat, low, and flush with the tab 102'. Two opposed ramps 105' and 106', transition out of the corner 104' from the low tab 102' to the wall 103' around the port 101'. The ramps 105' and 106' are each inclined obliquely from the tab 102' to the wall 103'. The ramps 105' and 106' are offset transversely with respect to each other; the ramp 105' is proximate to and parallel to the side 92, and the ramp 106' is proximate to and parallel to the proximal end 90'. The finger 83' extends outwardly from the wall 103' at the ramp 106'. With the corner 104' disposed between the ramps 105' and 106', the corner 104' defines a low point around the port 101' through which the nose 71' of the cam 34' can move as the cam 34' rotates. As stated above, each of the gates 33' is identical in structure. In location, the gates 33' are spaced apart radially about the axle 42', each separated by the roughly triangular voids 66' extending between the casing 150 and the sidewall 122.

In the retracted position of the gate 33', the gate 33' is retracted radially away from the sidewall 122, toward the cam 34', and the outlet 22' corresponding to the gate 33' is closed by the gate 33', as with the valve 10. In the advanced position, however, the distal end 91' of the gate 33' is advanced toward the sidewall 122, away from the cam 34', and the gate 33' opens the outlet 22'. The gates 33' move between the retracted and advanced positions in tracks 152 formed between the top and bottom plates 131 and 133. The tracks 152 are formed by cooperation of the top plate 131 registered with and fitted to the bottom plate 133.

Still referring to FIGS. 10A and 10B, six tracks 152 extend radially outward from the axis A'. Each of the tracks 152 is identical in every way other than location and orientation, and so only one of the tracks 152 will be described and referenced herein specifically, with the understanding that the description is equally applicable to the other tracks 152, unless otherwise noted. The track 152 is a shallow channel formed between two opposed radial walls 111' and 112', the top plate 131, the bottom plate 133, and terminating at the sidewall 122. The walls 111' and 112' are spaced apart from each other by a constant distance just greater than the width of a gate 33' between the opposed sides 92' and 93' of the gate 33'. The walls 111' and 112' are formed integrally to the bottom plate 133 and project upwardly a short height just greater than the thickness of the gates 33' at the faces 100' of the gates 33'. When the top plate 131 is coupled to the bottom plate 133, such as with fasteners such as screws through the holes 148, the walls 111' and 112' extend vertically completely from the upper surface 153 of the bottom plate 133 to the lower surface 154 of the top plate 131, so as to define a cylindrical, horizontally-extending hold forming a part of the track 152 in which the gate 33' reciprocates. That hold has an "open" end on an inner end, and the sidewall 81' of the cam 34' is disposed in that open end; the hold is open on the opposed outer end but closed by the sidewall 122 of the housing 121 when the cartridge 140 is applied to the housing 121. The bottom plate 133 has an inner, upper surface 153 which is smooth and flat, and along which the gate 33' reciprocates in sliding contact. The lower surface 95' of the gate 33' slides in direct contact along the upper surface 153 of the bottom plate 133 with low friction. Opposed from the upper surface 153 is a lower surface 154 of the top plate 131 (seen in FIG. 10B), which defines the top of the track 152 and against which the upper surface 94' of the gate 33' reciprocates in sliding contact. The upper surface 94' of the gate 33' slides in direct contact along the lower surface 154 of the top plate 131 with low friction. In this manner, the gate 33' is contained within the track 152 by the walls 111' and 112', the upper surface 153 of the bottom plate 133, the lower surface 154 of the top plate 131, the sidewall 122 of the housing 121, and the sidewall 81' of the cam 34'. The cartridge 140 thus completely contains the gates 33'.

The cam 34' rotates atop the upper surface 153. An annular lip 156 (visible in FIG. 10A only) projects integrally and upwardly from the upper surface 153 of the bottom plate 133 centrally with respect to all of the tracks 152. The lip 156 corresponds to a channel 157 (visible in FIG. 10B only) formed upwardly into the cam 34' from the bottom 75' of the cam 34'. The lip 156 and the channel 157 have equal inner and outer diameters and correspond in shape. The cam 34' rides on the lip 156 with the lip 156 seated in the channel 157 as the cam 34' rotates. Together with the axle 42', the lip 156 limits the cam 34' from lateral displacement during operation.

An aperture 155 is formed in each track 152, and there are thus six apertures 155 in the preferred embodiment of the valve 120. The apertures 155 in the tracks 152 are aligned axially with the apertures 141 in the top plate 131, such that each aperture 155 corresponds to a corresponding one of the apertures 141 and is sequentially coupled and decoupled in fluid communication with the corresponding aperture 141 by reciprocal movement of the gate 33' carried in the track 152 in which the aperture 155 is formed. Like the apertures 141, the apertures 155 are generally rectangular and extend vertically entirely through the bottom plate 133 from the upper surface 153 to the underside of the bottom plate 133. Each aperture 155 has an inner edge, an opposed outer edge, and opposed parallel sides. The inner edge and the outer edge are each curved such that the inner edge forms a convex edge of the aperture 155 and the outer edge forms a concave edge of the aperture 155. The sides are parallel and arranged nearly radially with respect to the axis A'. The sides are generally transverse to the inner and outer edges. When the bottom plate 133 is coupled to the top plate 131, the inner edges are proximate to the casing 150, and the outer edges are located approximately two-thirds between the inner edge and the sidewall 122 when applied to the housing 121, as in FIG. 9. As stated above, each of the tracks 152 is identical in structure. In location, the tracks 152 are spaced apart radially about the axle 42', each separated by one of the roughly triangular voids 151. Within these tracks 100', the gates 33' reciprocate in response to rotation of the cam 34'.

Referring to FIG. 9, as water enters the valve 120 along arrowed line W', the impeller 30' rotates in a counter-clockwise rotation, causing the central and offset gears 53' and 54' in the reduction cassette 32' to rotate. The reduction cassette 32' thereby causes the cam 34' to rotate, albeit much more slowly than the impeller 30', because the gear 147 on the cam 34' is enmeshed with the reduction cassette 32'. As with the valve 10 of FIGS. 1-7, and referring collectively to FIGS. 8-10B, rotation of the cam 34' causes the nose 71' of the cam 34' to move in counter-clockwise rotation along arrowed line C'. As the nose 71' of the cam 34' rotates over a gate 33', the nose 71' first moves over the tab 102' and then into the corner 104'. The pin 82' is fit into the channel 80' of the cam 34', and the sidewall 81' of the cam 34' is fit between the pin 82' and the inner face of the finger 83'. As the cam 34' continues to rotate toward alignment with the gate 33', the nose 71' moves into the track 152. The pin 82', carried in the channel 80', is urged radially outward, as the portion of the channel 80' in which the pin 82' is moving into at the tip of the nose 71' is moved radially outward in the track 152. The pin 82', carried integrally on the gate 33', causes the gate 33' to slide radially outward, thereby moving the port 101' in the gate 33' between the apertures 141 and 155 in the top plate 131 and the bottom plate 133, respectively. When the cam 34' has rotated such that the cam 34' is aligned with the gate 33' in the track 152 and the pin 82' is at the tip of the nose 71', the gate 33' is fully moved into the advanced position thereof, and the port 101' is aligned with the apertures 141 and 155, thus coupling the apertures 141 and 155 in fluid communication and opening the outlet 22' below the gate 33'. Water moving through the housing 121 can thus exit the valve through this alignment of the aperture 141, the port 101', the aperture 155, and the outlet 22', along the line X' in FIG. 9.

When the one of the gates 33' is fully in the advanced position opening the outlet 22' below it, the other gates 33' are each fully in the retracted position thereof. As with the gates 33 and the cam 34 of the valve 10, when the nose 71' is aligned with the one of the gates 33', each of the pins 82' of the other gates 33' is held close to the axis A' in the channel 80' which is circular around the heel 70' of the cam 34'. Thus, only one outlet 22' is fully opened at a time. The ports 101' of the other gates 33' are misaligned with the aperture 141 in the top plate 131 and the aperture 155 in the bottom plate 133, thereby decoupling the apertures 141 and 155 from fluid communication and closing the outlet 22' below the gate 33'. As water continues to enter the valve 120 and spin the impeller 30', the cam 34' continues to move in counter-clockwise rotation. As the cam 34' moves the nose 71' out of alignment with the one of the gates 33', the nose 71' moves toward and into the next gate 33'. This next gate 33' slowly begins to be urged radially outward, as the one of the gates 33' moves radially inward. Thus, the one of the gates 33' and this next gate 33' do both partially open their respective outlets 22' for a small portion of time. However, the concave shape of the leading flank 72' and the convex shape of the closing flank 73' minimize this portion of time in which two outlets 22' are both open; the concave shape of the opening flank 72' delays opening of the "leading" outlet 22', and the convex shape of the closing flank 73' quickens opening of the "trailing" outlet 22' more so than would be true with a symmetric cam 34'.

In this way, each outlet 22' is sequentially opened and closed, as the corresponding gate 33' above the outlet 22' reciprocates between the advanced position and the retracted position, respectively, and water is pumped to in-floor cleaning heads installed throughout the pool.

A preferred embodiment is fully and clearly described above so as to enable one having skill in the art to understand, make, and use the same. Those skilled in the art will recognize that modifications may be made to the described embodiment without departing from the spirit of the invention. To the extent that such modifications do not depart from the spirit of the invention, they are intended to be included within the scope thereof.

The invention claimed is:

1. A water distribution valve for directing a flow of fluid through a swimming pool cleaning system, the water distribution valve comprising:
   a housing having an inlet and outlets;
   a plurality of gates, each corresponding to a respective one of the outlets and being mounted for reciprocation in the housing radially with respect to a center of the gates; and
   each gate is mounted to open and close the respective one of the outlets to which the gate corresponds in response to the flow of fluid into the housing from the inlet.

2. The water distribution valve of claim 1, wherein each gate is mounted for reciprocation between an advanced position opening the respective one of the outlets and a retracted position closing the respective one of the outlets.

3. The water distribution valve of claim 2, further comprising:
a bottom of the housing;
a panel disposed above the bottom of the housing;
a plurality of tracks defined between the panel and the bottom of the housing, each track including an aperture formed in the panel and an aperture formed in the bottom of the housing;
the gates are carried in the tracks, and each gate has a port formed through the gate;
in the advanced position of each gate, the port of the gate is aligned with the apertures formed in the panel and bottom in the respective track; and
in the retracted position of each gate, the port of the gate is misaligned with the apertures formed in the panel and bottom in the respective track.

4. The water distribution valve of claim 1, further comprising:
a cam mounted for rotation in response to application of the flow of fluid into the housing from the inlet; and
the cam is operably coupled to the gates to impart reciprocal movement to the gates in response to rotational movement of the cam.

5. The water distribution valve of claim 4, further comprising:
a track in the cam;
each gate includes a pin which is disposed within the track in the cam; and
as the cam rotates, each of the pins slide within the track in the cam, the track in the cam guiding movement of each of the pins.

6. The water distribution valve of claim 4, wherein:
the cam includes a nose, opposed opening and closing flanks, opposed opening and closing ramps, and a heel;
the nose is convex;
the opening flank is concave; and
each of the opening ramp, heel, closing ramp, and closing flank is convex.

7. The water distribution valve of claim 4, further comprising an impeller coupled to the cam.

8. The water distribution valve of claim 7, further comprising a reduction gear assembly coupling the impeller to the cam.

9. The water distribution valve of claim 4, further comprising:
a cartridge applied to the housing; and
the cartridge carries the gates and the cam as an assembly.

10. The water distribution valve of claim 9, wherein the cartridge is removable from the housing together with the gates and the cam carried therein.

11. The water distribution valve of claim 9, wherein the cartridge comprises:
a top plate coupled to an opposed bottom plate; and
the gates are carried between the top and bottom plates for reciprocation.

12. The water distribution valve of claim 11, further comprising:
tracks formed in each of the top plate and the bottom plate, defining channels; and
the gates are carried for reciprocation in the channels.

13. A water distribution valve for directing a flow of fluid through a swimming pool cleaning system, the water distribution valve comprising:
a housing having an inlet, outlets, a bottom, a panel disposed above the bottom, and a plurality of tracks defined between the panel and the bottom, each track including an aperture formed in the panel and an aperture formed in the bottom;
a plurality of gates, each corresponding to a respective one of the outlets, and each mounted in the housing for reciprocal movement between a retracted position closing the respective one of the outlets and an advanced position opening the respective one of the outlets;
the gates are carried in the tracks, and each gate has a port formed through the gate;
in the advanced position of each gate, the port of the gate is aligned with the apertures formed in the panel and bottom in the respective track;
in the retracted position of each gate, the port of the gate is misaligned with the apertures formed in the panel and bottom in the respective track;
a drive assembly carried by the housing and operably coupled to each of the gates; and
in response to application of the flow of fluid into the housing, the drive assembly imparts reciprocation to the plurality of gates.

14. The water distribution valve of claim 13, wherein the gates are each mounted for reciprocation radially with respect to a center of the gates.

15. The water distribution valve of claim 13, wherein the drive assembly includes:
a cam mounted for rotation in response to application of the flow of fluid into the housing from the inlet; and
the cam is operably coupled to the gates to impart reciprocal movement to the gates in response to rotational movement of the cam.

16. The water distribution valve of claim 15, wherein the drive assembly further comprises:
a track in the cam;
each gate includes a pin which is disposed within the track in the cam; and
as the cam rotates, each of the pins slides within the track in the cam, the track in the cam guiding movement of each of the pins.

17. The water distribution valve of claim 15, wherein the drive assembly further comprises an impeller coupled to the cam.

18. The water distribution valve of claim 17, wherein the drive assembly further comprises a reduction gear assembly coupling the impeller to the cam.

19. The water distribution valve of claim 15, further comprising:
a cartridge applied to the housing; and
the cartridge carries the gates and the cam as an assembly.

20. The water distribution valve of claim 19, wherein the cartridge is removable from the housing together with the gates and the cam carried therein.

21. The water distribution valve of claim 19, wherein the cartridge comprises:
a top plate coupled to an opposed bottom plate; and
the gates are carried between the top and bottom plates for reciprocation.

22. The water distribution valve of claim 21, further comprising:
tracks formed in each of the top plate and the bottom plate, defining channels; and
the gates are carried for reciprocation in the channels.

23. A water distribution valve for directing a flow of fluid through a swimming pool cleaning system, the water distribution valve comprising:
a housing having an inlet, outlets, a bottom, a panel disposed above the bottom, and a plurality of tracks defined between the panel and the bottom, each track including an aperture formed in the panel and an aperture formed in the bottom;

a plurality of gates carried by the housing, each corresponding to a respective one of the outlets and mounted for reciprocal movement between a retracted position closing the one of respective outlets and an advanced position opening the one of the respective outlets;

the gates are carried in the tracks, and each gate has a port formed through the gate;

in the advanced position of each gate, the port of the gate is aligned with the apertures formed in the panel and bottom in the respective track;

in the retracted position of each gate, the port of the gate is misaligned with the apertures formed in the panel and bottom in the respective track; and a cam operatively coupled to each of the gates to impart reciprocal and sequential movement to the gates in response to rotational movement of the cam;

wherein application of the flow of fluid through the housing from the inlet imparts rotational movement to the cam, sequentially urging the gates into the advanced position opening the respective one of the outlets.

24. The water distribution valve of claim 23, wherein the gates are each mounted for reciprocation radially with respect to a center of the gates.

25. The water distribution valve of claim 23, further comprising:
a track in the cam;
each gate includes a pin which is disposed within the track in the cam; and
as the cam rotates, each of the pins slides within the track in the cam, the track in the cam guiding movement of each of the pins.

26. The water distribution valve of claim 23, further comprising an impeller coupled to the cam.

27. The water distribution valve of claim 26, further comprising a reduction gear assembly coupling the impeller to the cam.

28. The water distribution valve of claim 23, further comprising:
a cartridge applied to the housing; and
the cartridge carries the gates and the cam as an assembly.

29. The water distribution valve of claim 28, wherein the cartridge is removable from the housing together with the gates and the cam carried therein.

30. The water distribution valve of claim 28, wherein the cartridge comprises:
a top plate coupled to an opposed bottom plate; and
the gates are carried between the top and bottom plates for reciprocation.

31. The water distribution valve of claim 30, further comprising:
tracks formed in each of the top plate and the bottom plate, defining channels; and
the gates are carried for reciprocation in the channels.

* * * * *